(12) United States Patent
Yamada et al.

(10) Patent No.: US 7,633,567 B2
(45) Date of Patent: Dec. 15, 2009

(54) LIQUID CRYSTAL GLARE-PROOF MIRROR

(75) Inventors: Ayako Yamada, Shizuoka (JP);
Masahiro Motomiya, Fujieda (JP);
Hidenori Sato, Fujieda (JP)

(73) Assignee: Murakami Corporation, Shizuoka (JP)

( * ) Notice: Subject to any disclaimer, the term of this patent is extended or adjusted under 35 U.S.C. 154(b) by 14 days.

(21) Appl. No.: 12/112,123

(22) Filed: Apr. 30, 2008

(65) Prior Publication Data
US 2009/0002575 A1 Jan. 1, 2009

(30) Foreign Application Priority Data
Jun. 28, 2007 (JP) .............................. 2007-170101

(51) Int. Cl.
*G02F 1/1335* (2006.01)
(52) U.S. Cl. ................. 349/16; 349/1; 349/19; 349/33; 349/41
(58) Field of Classification Search ............... 349/1, 349/16, 19, 33, 41
See application file for complete search history.

(56) References Cited
U.S. PATENT DOCUMENTS

| | | | |
|---|---|---|---|
| 4,603,946 | A | 8/1986 | Kato et al. |
| 5,253,109 | A | 10/1993 | O'Farrell et al. |
| 5,285,060 | A | 2/1994 | Larson et al. |
| 6,801,283 | B2 * | 10/2004 | Koyama et al. ............. 349/119 |
| 7,092,052 | B2 * | 8/2006 | Okamoto et al. ............. 349/113 |
| 7,268,841 | B2 | 9/2007 | Kasajima et al. |

FOREIGN PATENT DOCUMENTS

| | | |
|---|---|---|
| JP | 60-212730 A | 10/1985 |
| JP | 61-260217 A | 11/1986 |
| JP | 03-243914 | 10/1991 |
| JP | 2004-037944 | 2/2004 |

OTHER PUBLICATIONS

Extended European Search Report on corresponding European Patent Application No. 08 155 515.3 dated Oct. 9, 2008.

* cited by examiner

*Primary Examiner*—Jennifer Doan
(74) *Attorney, Agent, or Firm*—Capitol City TechLaw, PLLC (57) ABSTRACT

A liquid crystal glare-proof mirror is capable of displaying a picture in which a non-glare-proof mode and a glare-proof mode is switched, including a first polarizing plate for selecting a polarization component to be transmitted; a liquid crystal cell disposed at a back of the first polarizing plate, the liquid crystal cell having two control areas, each of which is controlled independently; a second polarizing plate disposed at a back of the liquid crystal cell, the second polarizing plate transmitting either one of two orthogonal polarization components of light and reflecting the other one of the polarization components; and an image generating apparatus disposed at a part of a back of the second polarizing plate, the part corresponding to either one of the two control areas, the image generating apparatus ejecting picture light having a polarization component which is transmitted through the second polarizing plate.

8 Claims, 8 Drawing Sheets

LIQUID CRYSTAL GLARE-PROOF MIRROR

CROSS REFERENCE TO RELATED APPLICATIONS

This application claims the foreign priority benefit under 35 U.S.C. §119 of Japanese Patent Application No. 2007-170101 filed on Jun. 28, 2007, the disclosure of which is incorporated herein by reference.

BACKGROUND OF THE INVENTION

1. Field of the Invention

The present invention relates to a liquid crystal glare-proof mirror used for an inner mirror or an outer mirror of a vehicle, for example.

2. Description of the Related Art

Conventionally, a liquid crystal glare-proof mirror including, for example, a liquid crystal cell having electrodes for forming picture elements, a half mirror disposed at the back of the liquid crystal cell, a back light disposed at the back of the half mirror and means for driving the electrodes in the liquid crystal cell (as disclosed in Unexamined Patent Publication (Kokai) No. 03-243914) has been known.

The liquid crystal glare-proof mirror disclosed in Unexamined Patent Publication (Kokai) No. 03-243914 employs a half mirror, and there has been a problem that the screen is dark when a picture is displayed because the half mirror only transmits or reflects about half of incident light.

SUMMARY OF THE INVENTION

An object of the present invention is to provide a liquid crystal glare-proof mirror which enables to display a bright screen by allowing light to propagate through an optical system having low optical transmission loss.

A first aspect of the present invention provides a liquid crystal glare-proof mirror that switches a non-glare-proof mode and a glare-proof mode and displays a picture thereon, including a first polarizing plate for selecting a polarization component to be transmitted through the first polarizing plate; a liquid crystal cell disposed on a back side of the first polarizing plate and having two control areas, each of which is controlled independently; a second polarizing plate disposed on a back side of the liquid crystal cell, the second polarizing plate transmitting either one of two orthogonal polarization components of light and reflecting the other one of the polarization components; and an image generating apparatus disposed on a back of the second polarizing plate at a part corresponding to either one of the two control areas, the image generating apparatus emitting picture light having a polarization component which is transmitted through the second polarizing plate.

In the aforementioned liquid crystal glare-proof mirror, when the picture light is not emitted from the image generating apparatus the liquid crystal glare-proof mirror controls switching between the non-glare-proof mode and the glare-proof mode by synchronizing the two control areas.

In the aforementioned liquid crystal glare-proof mirror, the image generating apparatus includes an optical absorption function for absorbing light transmitted through the second polarizing plate.

In the aforementioned liquid crystal glare-proof mirror, an optical absorption member for absorbing light is disposed on the back of the second polarizing plate at a part corresponding to the other of the two control areas where the image generating apparatus is not disposed.

Other features and advantages of the present invention will become more apparent from the following detailed descriptions of the invention when taken in conjunction with the accompanying drawings.

DETAILED DESCRIPTION OF THE INVENTION

Figures 1A, 1B:
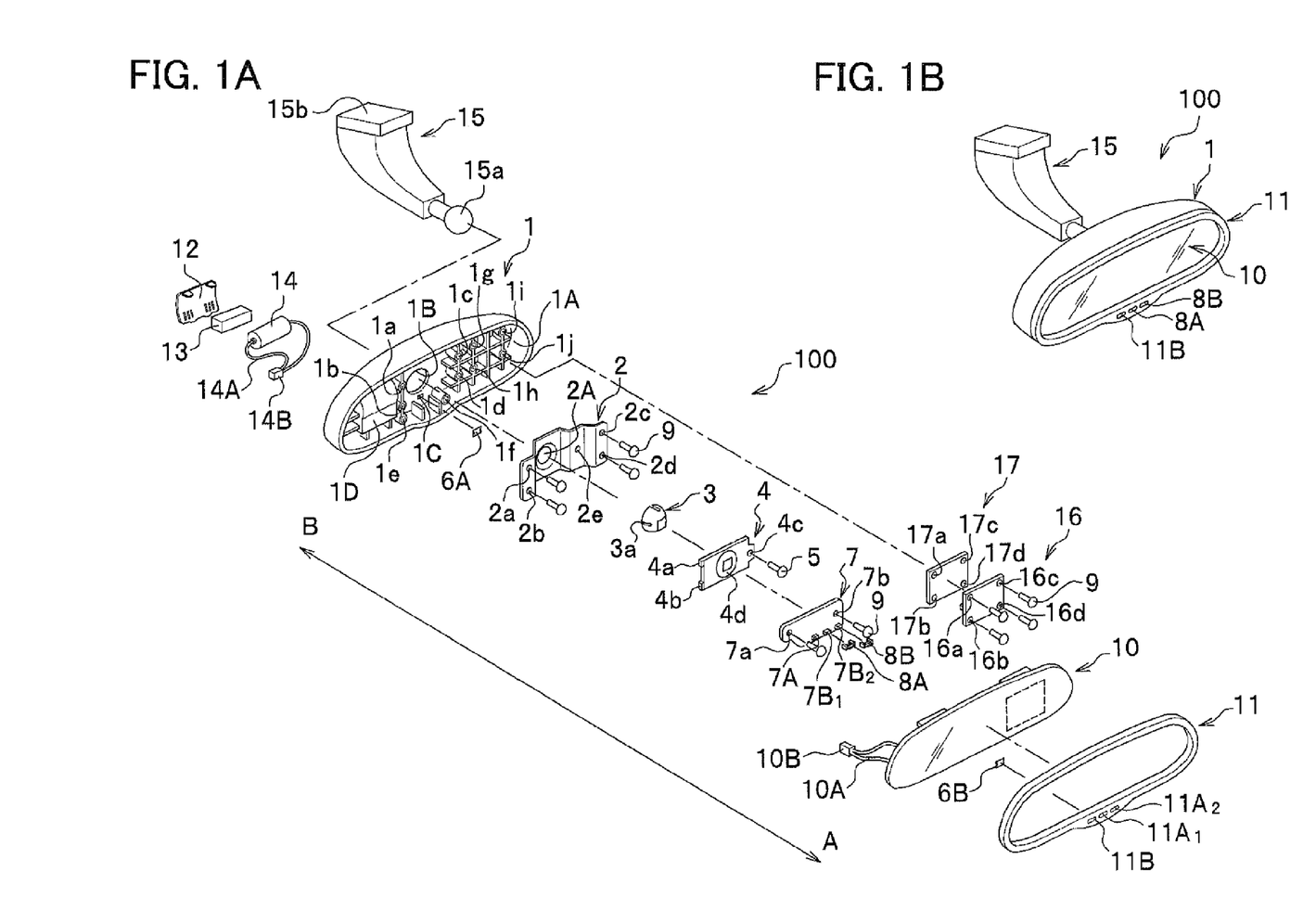
FIG. 1A is an exploded perspective view of the liquid crystal glare-proof mirror 100.
FIG. 1B is a perspective view showing the liquid crystal glare-proof mirror 100 after the mirror 100 is assembled.

The external appearance of a liquid crystal glare-proof mirror 100 is described below with reference to FIG. 1. FIG. 1 is a view showing the external appearance of the liquid crystal glare-proof mirror 100 according to an embodiment of the present invention. FIG. 1A is an exploded perspective view of the liquid crystal glare-proof mirror 100. FIG. 1B is a perspective view showing the liquid crystal glare-proof mirror 100 after the mirror is assembled. In this specification, a "front side" means the side of the liquid crystal glare-proof mirror 100 in a direction indicated by an arrow A, and a "rear side" means the side of the liquid crystal glare-proof mirror 100 in a direction indicated by an arrow B.

The liquid crystal glare-proof mirror 100 mainly includes a body 1, a support 2, a bush 3, a plate 4, a screw 5, sensor covers 6A, 6B, a plate circuit 7, buttons 8A, 8B, tapping screws 9, a mirror body 10, a ring 11, a battery cover 12, a seal 13, a battery 14, a stay 15, a liquid crystal monitor 16 and an liquid crystal monitor control circuit board 17. The liquid crystal glare-proof mirror 100 is assembled by these parts.

The body 1 is a container having an opening 1A which meets the outside shape of the mirror body 10. The body 1 also includes screw holes 1a, 1b, 1c and 1d for fixing the support 2, screw holes 1e, 1f for fixing the plate circuit 7, and screw holes 1g, 1h, 1i for fixing the liquid crystal monitor 16 and the liquid crystal monitor control circuit board 17. The body 1 further includes on the bottom surface of the body 1 which is opposed to the opening 1A an installation hole 1B into which the stay 15 is inserted, and a hole 1C through which a surrounding light sensor 7C, which is described later, detects surrounding light via the sensor cover 6A. The body 1A is also provided with a storage portion 1D for storing a battery 14.

The support 2, the bush 3 and the plate 4 are members for installing the stay 15. The support 2 includes screw holes 2a, 2Bb, 2c, 2d corresponding to the screw holes 1a, 1c, 1d, 1d. Four tapping screws 9 are inserted into the screw holes 2a, 2b, 2c, 2d and then screwed into the screw holes 1a, 1b, 1c, 1d to fix the support 2 to the body 1. The support 2 includes an installation hole 2A corresponding to the installation hole 1B. The support 2 also includes a screw hole 2e for fixing the plate 4.

The bush 3 is formed in a substantially hemispheric body having an opening (not shown) facing toward the rear side. A cutout 3a is formed at the opening side of the bush 3. The bush 3 is fixed between the support 2 and the plate 4 with its opening side pressed along the circumference of the installation hole 2A.

Protrusions 4a, 4b are formed on the plate 4 and are fitted into cutouts (not shown) formed in the support 2. A hole 4c corresponding to the screw hole 2e is also formed in the plate 4. The screw 5 is inserted into the hole 4c and then screwed into the screw hole 2e to fix the plate 4 to the support 2 with the bush 3 sandwiched between the plate 4 and the bush 3. The plate 4 also includes a bush-axis receiving portion which is raised in a substantially hemispheric shape.

The plate circuit 7 includes a circuit for controlling a liquid crystal cell 10b (see FIG. 2) which is formed by mounting various electronic components on a print board. The plate circuit 7 also includes holes 7a, 7b corresponding to the screw holes 1e, 1f. The tapping screws 9 are inserted into the holes 7a, 7b and then screwed into the screw holes 1e, 1f to fix the plate circuit 7 to the body 1. A surrounding light sensor (not shown) disposed on the back side of the plate circuit 7 in FIG. 1, a backward light sensor (backward light-amount detection means) 7A and power switches 7B1 and 7B2 covered by the buttons 8A, 8B are mounted on the plate circuit 7. In this embodiment, the power switch 7B1 powers on and off the surrounding light sensor, and the power switch 7B2 powers on and off the backward light sensor 7A.

The mirror body 10 is configured to adjust the amount of reflected light by switching between a non-glare-proof mode and a glare-proof mode based on the relationship of the light volume of surrounding light and that of back light. To be more specific, the mirror body 10 is formed by laminating a first polarizing plate (not shown in FIG. 1) which transmits a particular first polarization component of incident light as transmitted light and a second polarizing plate (not shown in FIG. 1) which transmits a particular second polarization component of the incident light as transmitted light and sandwiching a liquid crystal cell (not shown in FIG. 1) therebetween. In this embodiment, a picture is displayed in an area indicated by dashed lines on the mirror body 10 in FIG. 1, which is described later. A cable 1A for supplying electricity to the liquid crystal cell is also connected to the mirror body 10 and an end of the cable 10A is provided with a socket 10B. The internal structure of the mirror body 10 is described later in detail. The description of FIG. 1 continues herein.

A ring 11 is an elastic body for fixing the mirror body 10 to the body 1. The outer circumference of the mirror body 10 is fit into the inner circumference of the ring 11, and the ring 11 is fixed to the circumferential edge of the body 1. The ring 11 includes holes 11A1, 11A2 through which the buttons 8A, 8B protrudes outside, and a hole 11B through which a backward light sensor 7A detects back light via the sensor cover 6B.

A battery cover 12 covers an opening (not shown) of the storage portion 1D. A seal 13 prevents the battery 14 from being moved in a space of the storage portion 1D. A cable 14A is connected to a terminal of the battery 14 and the other end of the cable 14A is provided with a socket 14B. Although, in this specification, each of the socket 14B and the socket 10B is connected to a connecting terminal (not shown) on the plate circuit 7, wiring is not limited to this as long as both of the socket 14B and the socket 10B are electrically connected.

A stay 15 is for attaching the liquid crystal glare-proof mirror 100 to a ceiling and the like of a vehicle (not shown). An axle-center portion 15a, which is a spherical body, is formed at an end of the stay 15. The axle-center portion 15a is inserted into the installation hole 1B and the installation hole 2A and is gripped by the bush 3. The bush 3 allows the body 1 to be rotatably attached to the stay 15 at a desired angle. An upper surface portion 15b of the stay 15 is closely attached to a ceiling, a front window or the like with an adhesive agent or the like.

A liquid crystal monitor (image generating apparatus) 16 forms a picture. The liquid crystal monitor 16 (not shown) is configured by disposing a liquid crystal between two glass substrates with transparent electrodes for an active matrix drive system and laminating a black matrix or a color filter which forms pixels for an active matrix drive system. The liquid crystal monitor 16 includes screw holes 16a, 16b, 16c and 16d corresponding to the screw holes 1g, 1h, 1i and 1j.

The liquid crystal monitor control circuit board 17 includes a circuit or various electronic components for inputting picture data to be displayed on the liquid crystal monitor 16 and controlling the liquid crystal monitor 16 to form the picture. The liquid crystal monitor control circuit board 17 is electrically connected to the plate circuit 7. The liquid crystal monitor control circuit board 17 also includes a cable (not shown) extending outside of the body 1 so that picture data can be input from an external apparatus into the liquid crystal monitor control circuit board 17. Picture data may be input by any apparatus, e.g. a camera (not shown) for monitoring blind spots in the rear or front of a vehicle. Picture signals may be input by various apparatuses such as a DVD (digital versatile disk) player, and so-called one-segment broadcasting data may be also received.

The liquid crystal monitor control circuit board 17 also includes screw holes 1g, 1h, 1i, 1j and screw holes 17a, 17b, 17c and 17d corresponding to the screw holes 16a, 16b, 16c and 16d. The tapping screws 9 are inserted and screwed into the screw holes 16a, 16b, 16c and 16d, the screw holes 17a, 17b, 17c and 17d and the screw holes 1g, 1h, 1i and 1j to fix the liquid crystal monitor 17 and the liquid crystal monitor control circuit board 17 to the body 1.

As shown in FIG. 1B, the liquid crystal glare-proof mirror 100 is configured in such a manner that the body 1 to which the mirror body 10 is fixed by the ring 11 is further attached to a vehicle (not shown) by the stay 15. A driver presses the button 8A to use a glare-proof function whereas the button 8B is pressed to display a picture, which is explained later.

Figure 2:
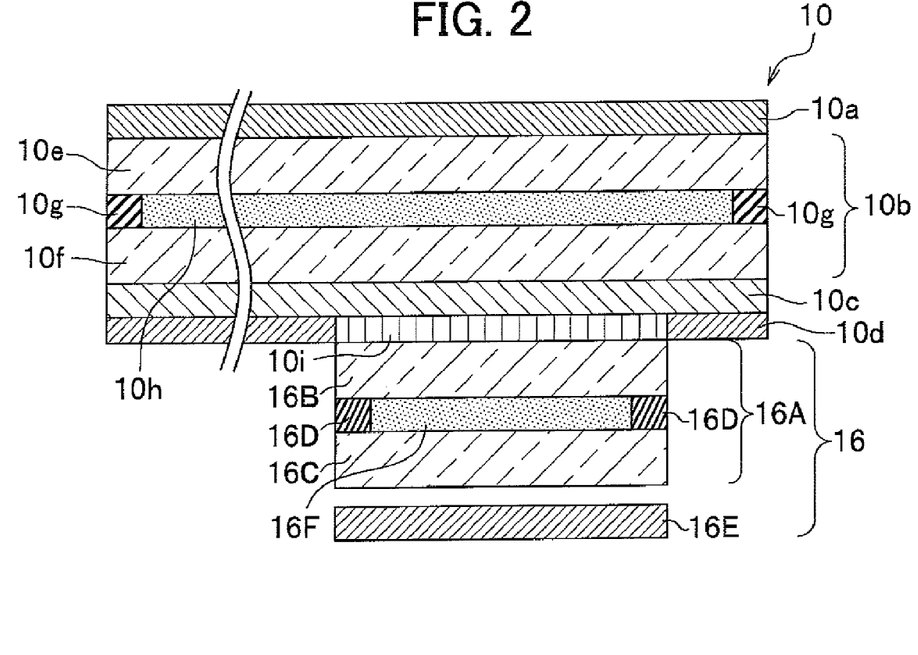
FIG. 2 is a cross-sectional view showing the internal structures of a mirror body 10 and a liquid crystal monitor 16 shown in FIG. 1.

Internal structures of the mirror body 10 and the liquid crystal monitor 16 are described below. FIG. 2 is a cross-sectional view showing the internal structures of the mirror body 10 and the liquid crystal monitor 16 shown in FIG. 1. The lower side of FIG. 2 shows the inward of the body 1 (the rear side) and the upper side of FIG. 2 shows the outward of the opening 1A of the body 1 (the front side). The mirror body 10 is configured in such a manner that a polarizing plate 10a, a liquid crystal cell 10b, a reflection polarizing plate (also referred to as a "second polarizing plate") 10c, an optical absorption member 10d are laminated as shown in FIG. 2. The liquid crystal monitor 16 is disposed at the back of the reflection polarizing plate 10c of the mirror body 10. The liquid crystal monitor 16 may be closely attached to the reflection polarizing plate 10c.

The polarizing plate (also referred to as a "first polarizing plate") 10a selects a polarization component to be transmitted and ejects to the liquid crystal cell 10b a particular first polarization component of incident light coming from the upper side of FIG. 2 as transmitted light. In the embodiment, the first polarization component is assumed to be a vertical polarization component. The polarizing plate 10a transmits to the upper side of FIG. 2 the first polarization component of incident light coming from the liquid crystal cell 10b as transmitted light. A driver forms an image on his or her retina according to the transmitted light, whereby the driver can check the rear of a vehicle.

The liquid crystal cell 10b is disposed at the back of the polarizing plate 10a and includes two control areas, each of which can be controlled independently. The liquid crystal cell 10b functions as a shutter which transmits or blocks light for each of the two control areas. Transparent electrodes (not shown) are wired in each control area of the liquid crystal cell 10b. The transparent electrodes are formed on glass substrates 10e, 10f and a liquid crystal 10h is injected between the glass substrates 10e and 10f. In this embodiment, the liquid crystal 10h is a TN (Twisted Nematic) liquid crystal. More specifically, the liquid crystal molecules are aligned in such a manner that incident light is rotated in each control area when no voltage is applied to the transparent electrodes (not shown) on the glass substrates 10e and 10f, whereas the incident light is not rotated in each control area when voltage is applied to the transparent electrodes. A sealing member (spacer) 10g is also disposed between the glass substrates 10e and 10f.

The reflection polarizing plate (the second polarizing plate) 10c is disposed at the back of the liquid crystal cell 10b and transmits either one of polarization components mutually-perpendicular to each other and reflects the other one of the polarization components. In this embodiment, a polarization component the reflection polarizing plate 10c transmits is a vertical polarization component (also referred to as a "second polarization component") and a polarization component the reflection polarizing plate 10c reflects is a horizontal polarization component (also referred to as a "third polarization component"). More specifically, the first polarization component (the vertical polarization component) and the third polarization component (the horizontal polarization component) are perpendicular to each other, and the first polarization component (the vertical polarization component) and the second polarization component (the vertical polarization component) are parallel to each other.

Figure 3:
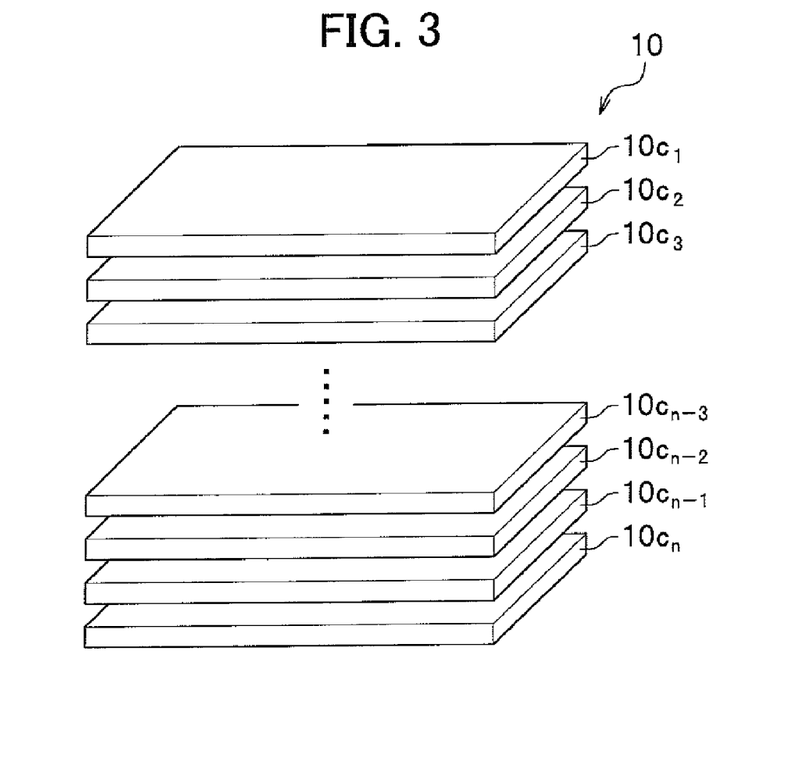
FIG. 3 is a perspective view showing the structure of a reflection polarizing plate 10c shown in FIG. 2.

The structure of the reflection polarizing plate 10c is described below. FIG. 3 is a perspective view showing the structure of the reflection polarizing plate 10c shown in FIG. 2. The reflection polarizing plate 10c is formed of a multilayer optical film structure made of resin layers 10c1, 10c2, 10c3, ..., 10cn-3, 10cn-2, 10cn-1 and 10cn. The reflection polarizing plate 10c produces a linearly polarized light by using multistage reflection (through resin layers 10ct to 10cn), using the characteristic of resin layers that light reflected by a reflection surface of resin layers at an angle is partly polarized.

In this embodiment, the polarizing plate 10a and the reflection polarizing plate 10c are formed of resin layers having refractive index anisotropy. The resin layers having the refractive index anisotropy are formed of materials such as a polyvinyl alcohol iodine system. For example, polyvinyl alcohol is stretched in various directions and then the polyvinyl alcohol molecules are aligned such that a helix structure of the polyvinyl alcohol molecules faces toward various directions so that the refractive index anisotropy is generated. The polyvinyl alcohol is then soaked in iodine solution so that iodine is absorbed in the helix structure. Thus, the resin layers having the refractive index anisotropy and a polarization performance are formed. Furthermore, it is preferable that the resin layers are sandwiched by cellulosic plastic films to increase their durability and the mechanical strength.

The polarizing plate 10a and the reflection polarizing plate 10c makes it possible to separate an ordinary ray from an extraordinary ray whose traveling direction is different from that of the ordinary ray by means of the refractive index anisotropy, whereby only the ordinary ray can be emitted toward eyes of a driver as reflected light. More specifically, even if the transmitted light emitted from the liquid crystal cell 10b includes an extraordinary ray generated by disordered behavior of the liquid crystal molecules, it is possible to exclude the extraordinary ray and to emit only an ordinary ray as reflected light.

Referring back to FIG. 2, the optical absorption member 10d is described below. The optical absorption member 10d is disposed at the back of the second polarizing plate 10c and is formed of membranes or films coated in black. Because the transmitted light ejected from the reflection polarizing plate 10c is the vertical polarization component (the second polarization component), a light polarizer which absorbs the vertical polarization component may be used as the optical absorption member 10d.

An optical transmission member 10i is formed in a part of the layer forming the optical absorption member 10d. The optical transmission member 10i is formed of a transparent material such as glass. The optical transmission member 10i may be formed of an air layer. The optical transmission member 10i may have the same optical transmission characteristic as that of the polarizing plate 10a or the reflection polarizing plate 10c. Therefore, the optical transmission member 10i may be integrally formed with the reflection polarizing plate 10c by making the reflection polarizing plate 10c thicker. In this embodiment, the optical transmission member 10i transmits the vertical polarization component. The optical transmission member 10i may not be necessarily provided, and the liquid crystal monitor 16 may be directly attached to the reflection polarizing plate 10c.

The liquid crystal monitor (an image generating apparatus) 16 (refer to FIG. 1) for generating a picture is disposed at the back of the optical transmission member 10i. The liquid crystal monitor 16 emits at least a light having a polarization component that can be transmitted through the optical transmission member 10i and the reflection polarizing plate 10c. A back light 16E is disposed at the back of the liquid crystal monitor 16A. The liquid crystal monitor 16 generates a picture by turning on and off each transparent electrode corresponding to each active matrix pixel according to picture data to be displayed to set the transmission rate of each pixel, and emitting light from the back light 16E to the liquid crystal cell 16A.

The active matrix transparent electrodes are wired in the liquid crystal cell 16A as described above. The transparent electrodes are formed on the glass substrates 16B and 16C, and a liquid crystal 16F is disposed between the glass substrates 16B and 16C. Also disposed between the glass substrates 16B and 16C is a sealing member (spacer) 16D. A black matrix (not shown) or a color filter (not shown) which forms an active matrix pixel is provided to the liquid crystal cell 16A as described above.

Operations of the liquid crystal glare-proof mirror 100 in a non-glare-proof mode and those in a glare-proof mode are explained below. The subscript "⊥" is assigned to the vertical polarization component and the subscript "=" is assigned to the horizontal polarization component hereinafter for the convenience of the explanation (see FIGS. 4A to 7B). An area AR1 and an area AR2 shown in FIGS. 4A to 7B indicate virtual areas on a surface of the polarizing plate 10a. The area AR2 is an area at the front of the liquid crystal monitor 16 that corresponds to one of the two control areas of the liquid crystal cell 10b. The area AR1 is an area at the front of the optical absorption member 10d that corresponds to the other one of the two control areas of the liquid crystal cell 10b.

Figure 4A:
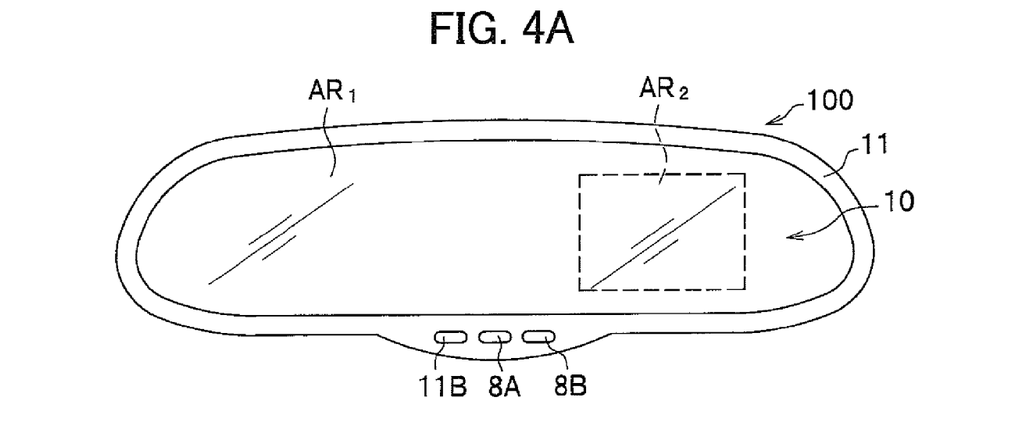
FIG. 4A is a front view of the liquid crystal in the non-display mode and in the non-glare-proof mode.
Figure 4B:
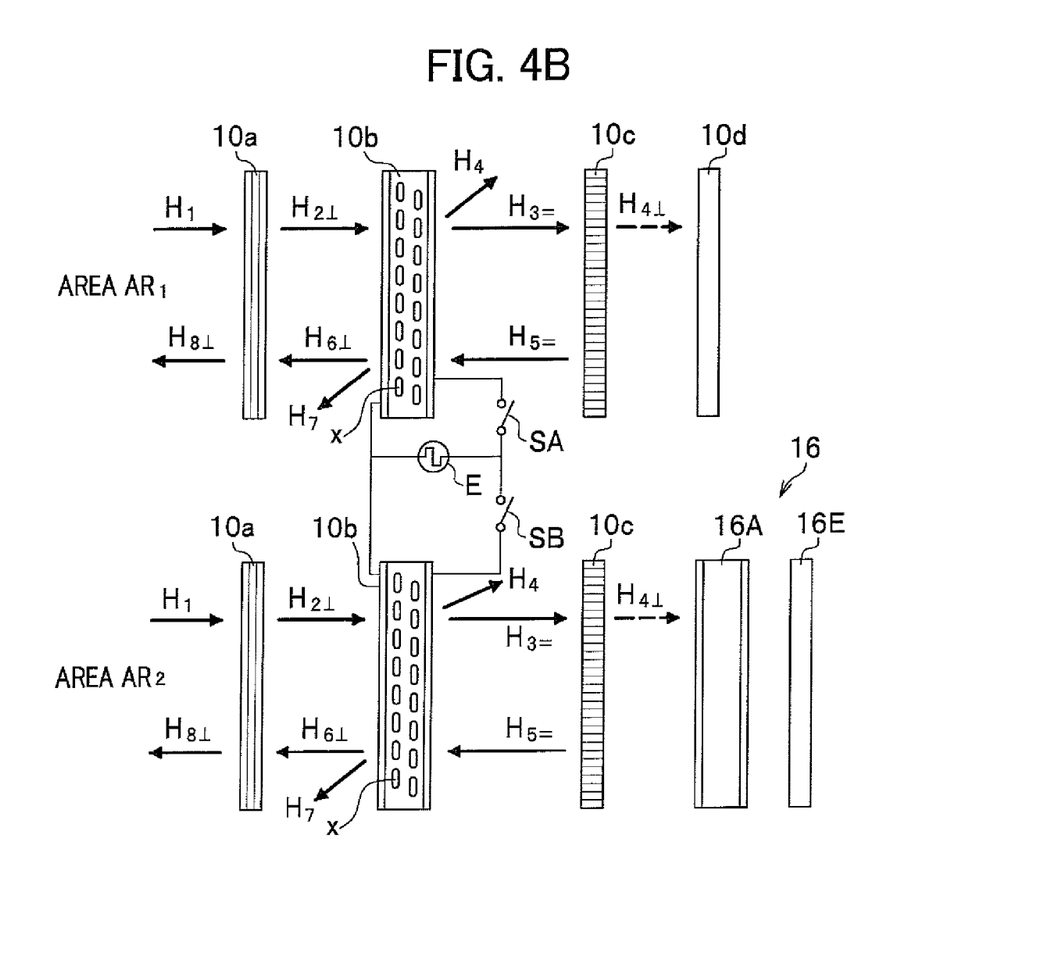
FIG. 4B is a schematic view showing a light passing through the mirror body 10 when the liquid crystal glare-proof mirror 100 is in the non-display mode and in the non-glare-proof mode.

The operation of the liquid crystal glare-proof mirror 100 in a non-display mode and in the non-glare-proof mode is described. FIG. 4 is a drawing for explaining the operation of the liquid crystal glare-proof mirror according to the embodiment in the non-display mode and in the non-glare-proof mode. FIG. 4A is a front view of the liquid crystal in the non-display mode and in the non-glare-proof mode. FIG. 4B is a schematic view showing a light passing through the mirror body when the liquid crystal glare-proof mirror is in the non-display mode and in the non-glare-proof mode.

In the liquid crystal glare-proof mirror 100 shown in FIG. 4A, substantially all vertical polarization component of incident light is reflected from the front surface of the mirror body 10 which is surrounded by the ring 11. In this case, because both of a switch SA for the area AR1 and a switch SB for the area AR2 are switched off as shown in FIG. 4B, alternating voltage from a power supply is not applied to the liquid crystal cell 10b. The switch SA is assumed to be on when alternating voltage is supplied to the liquid crystal cell 16A and is assumed to be off when alternating voltage is not supplied. Thus, even when the switch SA is off, the switch 8A (refer to FIG. 1) is not necessarily off, but the switch 8A may be on if the output of the surrounding light sensor is higher than that of the backward light sensor 7B. The switch SB controls the display of a picture, and thus the picture's on/off state corresponds to that of the switch 8B. Hence, when the switch SB is off, no picture is displayed.

When both of the switches SA and SB are off, liquid crystal molecules x are aligned in a vertical direction in FIG. 4 (horizontal to the direction of the electrodes) and arranged in a helical structure in the horizontal direction of FIG. 4 (vertical to the direction of the electrodes), and thus the liquid crystal cell 10b, which is a TN liquid crystal, has an optical rotatory power. The direction of electrodes is the direction of the glass substrates 10e and 10f in which the transparent electrodes are wired (refer to FIG. 2) (this is true in the entire specification)

In both of the area AR1 and the area AR2, when a light H1 (natural light (especially back light)) enters the polarizing plate 10a, the polarizing plate 10a transmits the vertical polarization component (the first polarization component) and ejects a light H2⊥ as shown in FIG. 4B. The light H2⊥ then enters the liquid crystal cell 10b and is rotated in substantially 90 degree by the optical rotatory power of the liquid crystal cell 10b and then emitted as a light (ordinary ray) H3=, which is the horizontal polarization component (the third polarization component). When the behavior of the liquid crystal molecules x in the liquid crystal cell 10b are disordered, an extraordinary ray H4 is ejected together with the light H3=.

Although the light H4 is generally the same horizontal polarization component as the light H3= because the light H4 is a light whose traveling direction is changed from that of the light H3, the light H4 is assumed to include the vertical polarization component which has not been rotated for the convenience of the explanation.

The light H3= ejected from the liquid crystal cell 10b enters the reflection polarizing plate 10c and is reflected as a light H5= because the light H3= is the horizontal polarization component (the third polarization component). The light H5= then enters the liquid crystal cell 10b and is rotated by the liquid crystal cell 10b. The light H5= is then ejected from the liquid crystal cell 10b as a light H6⊥, which is the vertical polarization component, and the light H6⊥ is then ejected from the polarizing plate 10a as a light H8⊥. When the behavior of the liquid crystal molecules x in the liquid crystal cell 10b are unstable, an extraordinary ray H7 is ejected together with the light H6⊥. Although the light H7 is generally the same vertical polarization component as the light H6⊥ because the light H7 is a light whose traveling direction is changed from that of the light H6⊥, the light H7 is assumed to include the horizontal polarization component which has not been rotated for the convenience of the explanation.

At the reflection polarizing plate 10c, the light H4=, which is the horizontal polarization component of the light H4, is bent significantly to be separated from the traveling direction of the light H5=. The light H4⊥, which is the horizontal polarization component of the light H4, transmits through the reflection polarizing plate 10c and is absorbed by the optical absorption member 10d. The light H7⊥, which is the vertical polarization component of the light H7 is bent significantly at the polarizing plate 10a to be separated from the traveling direction of the light H6⊥. The light H7=, which is the horizontal polarization component of the light H7 is absorbed by the polarizing plate 10a and then is radiated as heat.

Thus, when the liquid crystal glare-proof mirror 100 is in the non-display mode and in the non-glare-proof mode, it is possible to remove an extraordinary ray by the polarizing plate 10a and the reflection polarizing plate 10c and to eject only an ordinary ray as reflected light even when the extraordinary ray is generated in the liquid crystal cell 10b, whereby the liquid crystal glare-proof mirror 100 is less affected by the extraordinary ray generated in the liquid crystal cell 10b.

Figure 5A:
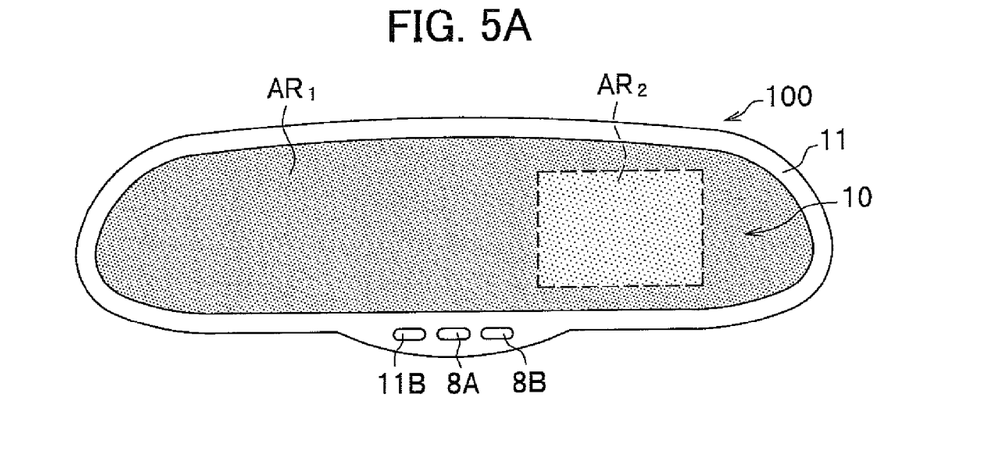
FIG. 5A is a front view of the liquid crystal glare-proof mirror in the non-display mode and in the glare-proof mode.
Figure 5B:
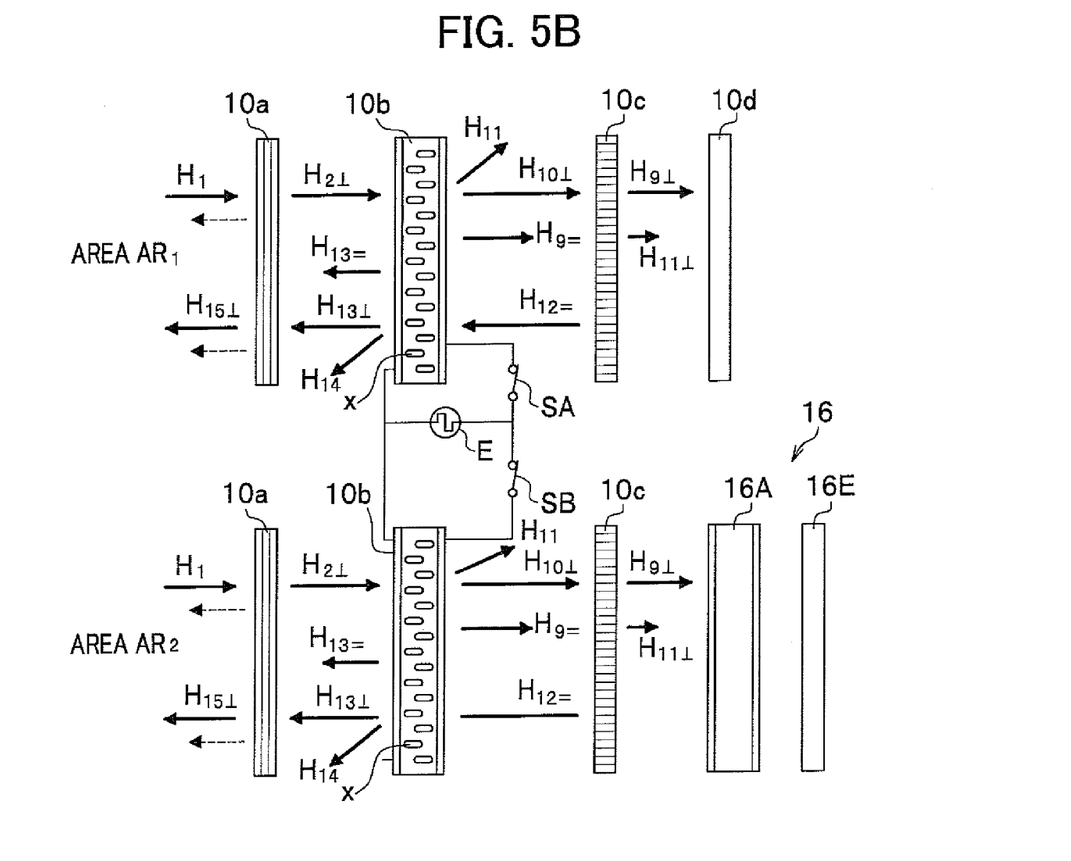
FIG. 5B is a schematic view of a light passing through the mirror body 10 when the liquid crystal glare-proof mirror 100 is in the non-display mode and in the glare-proof mode.

Next, the operation of the liquid crystal glare-proof mirror 100 in the non-display mode and in the glare-proof mode is described. FIG. 5 is a drawing for explaining the operations of the liquid crystal glare-proof mirror according to the embodiment in the non-display mode and in the glare-proof mode. FIG. 5A is a front view of the liquid crystal glare-proof mirror in the non-display mode and in the glare-proof mode. FIG. 5B is a schematic view of a light passing through the mirror body when the liquid crystal glare-proof mirror 100 is in the non-display mode and in the glare-proof mode. In the glare-proof mode in which incident light is absorbed, voltage is applied to both of the areas AR1 and AR2 in the liquid crystal cell 10b because both of the switches SA and SB are switched on. In this case, even if an extraordinary ray is generated in the liquid crystal cell 10b, the extraordinary ray will be diminished immediately, however the operation of the liquid crystal glare-proof mirror in a case where an extraordinary ray is generated is described below.

In the non-display mode and in the glare-proof mode, voltage is applied to the areas AR1 and AR2 and thus the liquid crystal molecules x are aligned in the horizontal direction of FIG. 5. The voltage value applied to the liquid crystal cell 10b is determined based on the relationship between the amount of surrounding light and that of back light, and the rotation of the polarization of the incident light is partly reduced based on the voltage value. More specifically, the liquid crystal cell 10*b* emits both of the vertical polarization component and the horizontal polarization component. Because the amount of polarized light to be transmitted is controlled by comparing the amount of the surrounding light and that of the back light, it is possible to control the amount of light which is reflected from the second polarizing plate 10*c*, transmitted through the liquid crystal cell 10*b* and then ejected from the polarizing plate 10*a*.

Although, in the embodiment, the voltage value applied to the liquid crystal cell 10*b* is controlled based on the amount of surrounding light and that of back light, a voltage value large enough to align all of the liquid crystal molecules x substantially vertical to the electrodes may always be applied to the liquid crystal cell 10*b* in the glare-proof mode. In the liquid crystal glare-proof mirror 100, a driver can catch back light even if all incident light is controlled to be absorbed in optical absorption member 10*d* because practically the back light is reflected by the surface of the polarizing plate 10*a* and a protective coat (not shown) covering the surface of the polarizing plate 10*a*. The voltage value may be changed in stages based on the amount of the back light to gradually reduce glare.

In the liquid crystal glare-proof mirror 100 shown in FIG. 5A, substantially no vertical polarization component of incident light is reflected by the front surface of the mirror body 10 which is surrounded by the ring 11. In this case, both of the switches SA and SB are switched on, and thus alternating voltage from the power supply E is applied to the liquid crystal cell 10*b* as shown in FIG. 5B. When alternating voltage is applied to the liquid crystal cell 10*b*, because the liquid crystal cell 10*b* is TN liquid crystal, a part of the liquid crystal molecules x is aligned in the vertical direction of FIG. 5 and are arranged in a helix structure in the horizontal direction, whereby the optical rotatory power of the liquid crystal cell 10*b* is reduced.

In both of the area AR1 and the area AR2, when a light H1 (natural light (especially back light)) enters the polarizing plate 10*a*, the polarizing plate 10*a* transmits the vertical polarization component (the first polarization component) and ejects a light H2⊥ as shown in FIG. 5B. The light H2⊥ then enters the liquid crystal cell 10*b* and a part of the light H2⊥ is rotated in substantially 90 degree by the optical rotatory power of the liquid crystal cell 10*b* and ejected as a light (ordinary ray) H9=, which is the horizontal polarization component (the third polarization component), and the other part of the light H2⊥ is ejected as a light H10⊥, which is the vertical polarization component (the second polarization component). When the behavior of the liquid crystal molecules x in the liquid crystal cell 10*b* are disordered, an extraordinary ray H4 is ejected together with the light H9=. Because the light H11 is a light whose traveling direction is changed from that of the light H9, the light H11 is generally the same horizontal polarization component as the light H9=, however, the vertical polarization component which has not been rotated is also assumed to be included in the light H11 for the convenience of the explanation.

The light H9= ejected from the liquid crystal cell 10*b* enters the reflection polarizing plate 10*c* and is reflected as a light H12= because the light H9= is the horizontal polarization component (the third polarization component). The light H12= then enters the liquid crystal cell 10*b* and a part of the light H12= is rotated by the liquid crystal cell 10*b* and ejected from the liquid crystal cell 10*b* as a light H13⊥, which is the vertical polarization component, and the other part of the light H12= is not rotated and ejected as a light H13=, which is the horizontal polarization component. Both of the light H13⊥ and the light H13= enter the polarizing plate 10*a*, but only the light H13⊥ is transmitted and ejected as a light H15⊥. When the behavior of the liquid crystal molecules x in the liquid crystal cell 10*b* are disordered, an extraordinary ray H14 is ejected together with the light H13⊥ and the light H13=. The light H14 is generally the vertical polarization component which is the same as the polarization component of the light H13⊥ because the light H14 is a light whose traveling direction is changed from that of the light H13⊥, however, the light H11 is also assumed to include the vertical polarization component which has not been rotated for the convenience of the explanation.

The light H11=, which is the horizontal polarization component of the light H11, is bent significantly at the reflection polarizing plate 10*c* to be separated from the traveling direction of the light H12=. The light H11⊥, which is the vertical polarization component of the light H11 passes through the reflection polarizing plate 10*c* together with the light H9⊥. The light H11⊥ and the light H9⊥ are absorbed in the optical absorption member 10*d* in the area AR1 and are absorbed and reflected by the liquid crystal cell 16A in the area AR2. Because the optical absorptance of an ordinary ray is different between the optical absorption member 10*d* and the liquid crystal cell 16A, the brightness of the area AR2 is a little higher than that of the area AR1 as shown in FIG. 5A. Preferably, the optical absorptance of the liquid crystal cell 16A is controlled such that the brightness of the area AR2 is the same as that of the area AR1.

The light H14⊥, which is the vertical polarization component of the light H14, is bent significantly at the polarizing plate 10*a* and to be separated from the traveling direction of the light H13⊥. The light H14=, which is the horizontal polarization component of the light H14, and a light H13= are absorbed in the polarizing plate 10*a* and radiated as heat.

As described above, when the liquid crystal glare-proof mirror 100 is in the non-display mode and in the glare-proof mode, it is possible to remove an extraordinary ray by the polarizing plate 10*a* and the reflection polarizing plate 10*c* and to eject only an ordinary ray as reflected light even when an extraordinary ray is generated in the liquid crystal cell 10*b*, whereby the liquid crystal glare-proof mirror 100 is less affected by the extraordinary ray generated in the liquid crystal cell 10*b*.

Figure 6A:
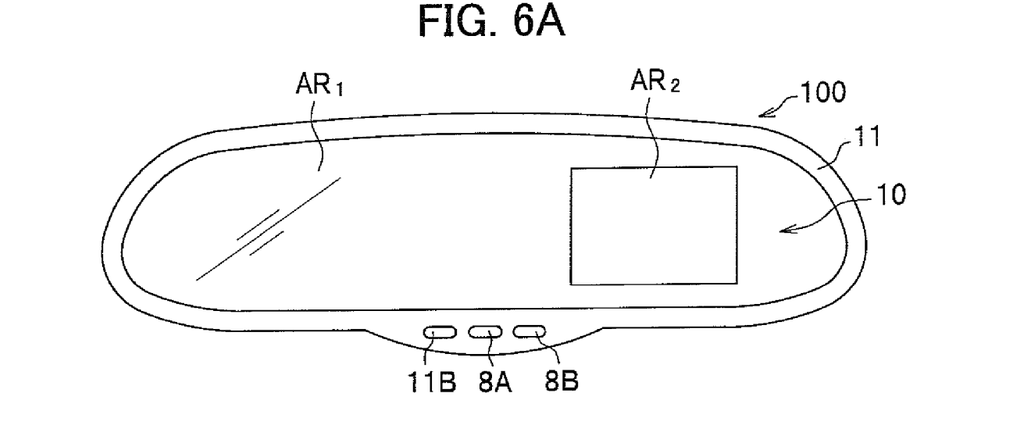
FIG. 6A is a front view of the liquid crystal glare-proof mirror 100 in the display mode and in the non-glare-proof mode.
Figure 6B:
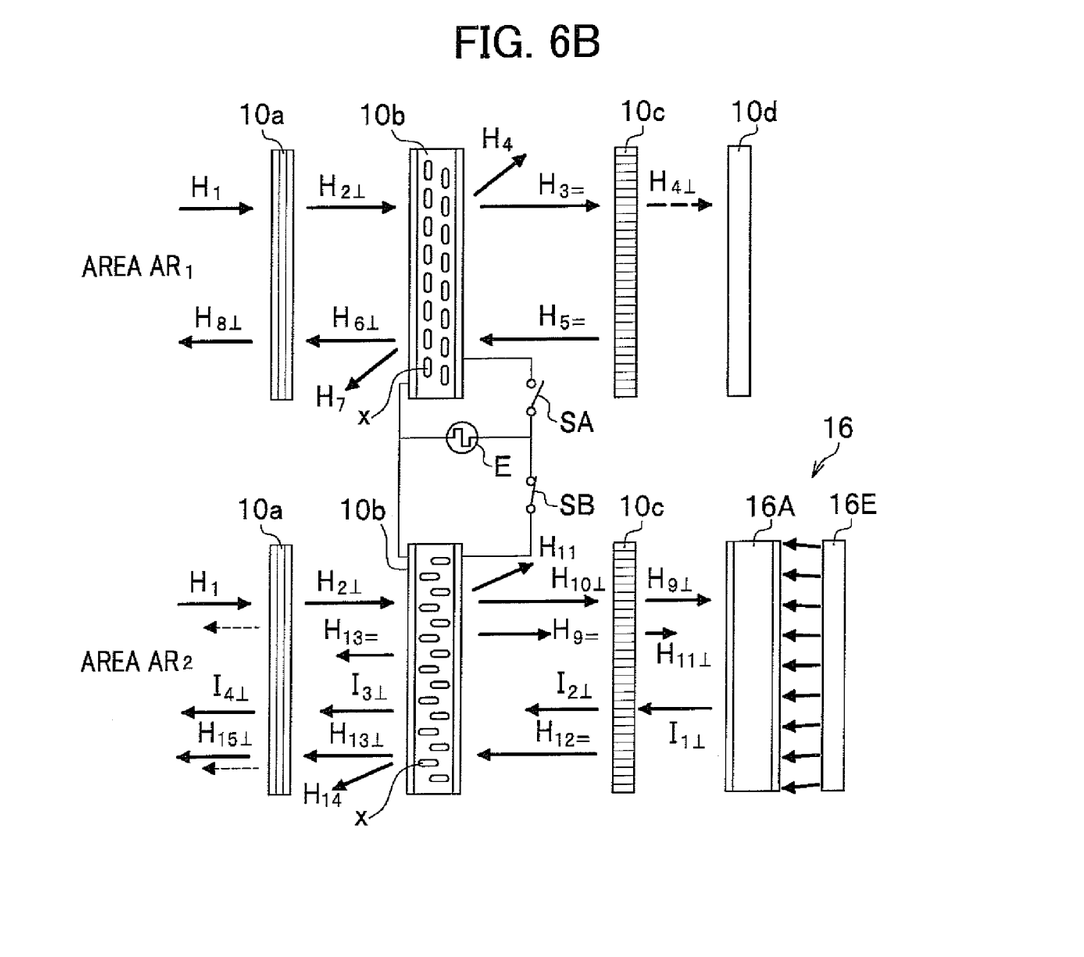
FIG. 6B is a schematic view of a light passing through the mirror body 10 when the liquid crystal glare-proof mirror 100 is in the display mode and in the glare-proof mode.

The operation of the liquid crystal glare-proof mirror 100 in a display mode and in the non-glare-proof mode is described. FIG. 6 is an illustration for explaining the operation of the liquid crystal glare-proof mirror 100 according to the embodiment in the display mode and in the non-glare-proof mode. FIG. 6A is a front view of the liquid crystal glare-proof mirror 100 in the display mode and in the non-glare-proof mode. FIG. 6B is a schematic view of a light passing through the mirror body 10 when the liquid crystal glare-proof mirror 100 is in the display mode and in the non-glare-proof mode. The switch SA is off because the liquid crystal glare-proof mirror 100 is in the non-glare-proof mode. The propagation of light in the area AR1 in this case is the same as that in the non-glare-proof mode shown in FIG. 4, and the description thereof will be omitted. On the other hand, the switch SB is on when the liquid crystal glare-proof mirror is in the display mode. Specifically, the propagation of light H1 in the area AR2 in this case is the same as that in the case where the liquid crystal glare-proof mirror 100 is in the non-display mode and in the glare-proof mode shown in FIG. 5. Thus, the propagation of picture lights (I1⊥, I2⊥, I3⊥, I4⊥) ejected by the liquid crystal monitor 16 is described hereinafter. A signal for switching the switch SB on is output as a timing signal through a wiring (not shown) to the liquid crystal monitor 16 to turn on the liquid crystal monitor 16.

In the liquid crystal monitor 16, when picture data is sent to the liquid crystal cell 16A, the transparent electrodes are switched on and off based on the picture data, and the image light I1⊥ is ejected when the back light 16E is lit. The picture light I1⊥ enters the reflection polarizing plate 10c and is ejected as a picture light I2⊥ with its polarization unchanged. The picture light I2⊥ then enters the liquid crystal cell 10b and is ejected as a picture light I3⊥ with its polarization unchanged. Because the picture light I3⊥ can pass through the polarizing plate 10a, the picture light I3⊥ is ejected from the polarizing plate 10a as a picture light I4⊥ with its polarization unchanged. Because the picture light I1⊥ ejected from the liquid crystal cell 16A propagates through the optical system having low transmission loss, the picture light I1⊥ is ejected as a picture light I4⊥ of which light volume is substantially the same as that of the picture light I1⊥. Therefore, a bright picture is displayed in the area AR2 as shown in FIG. 6A.

Figure 7A:
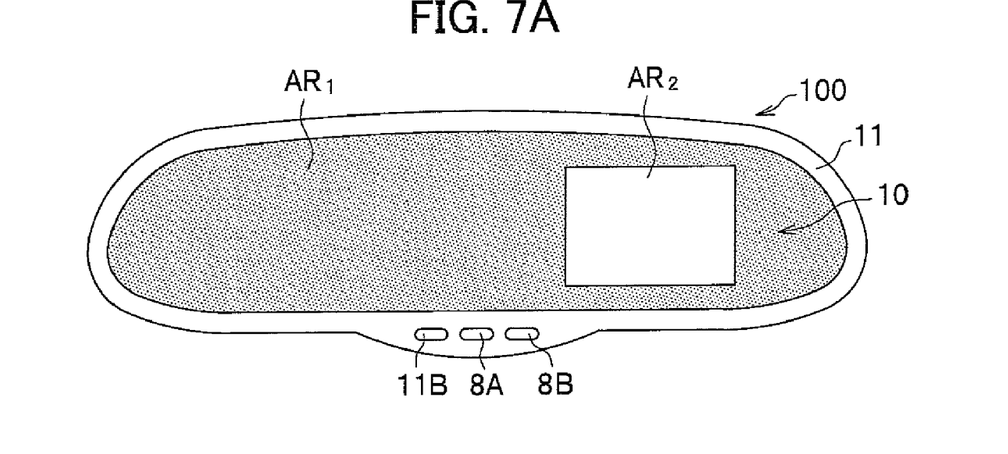
FIG. 7A is a front view of the liquid crystal glare-proof mirror in the display mode and in the glare-proof mode.
Figure 7B:
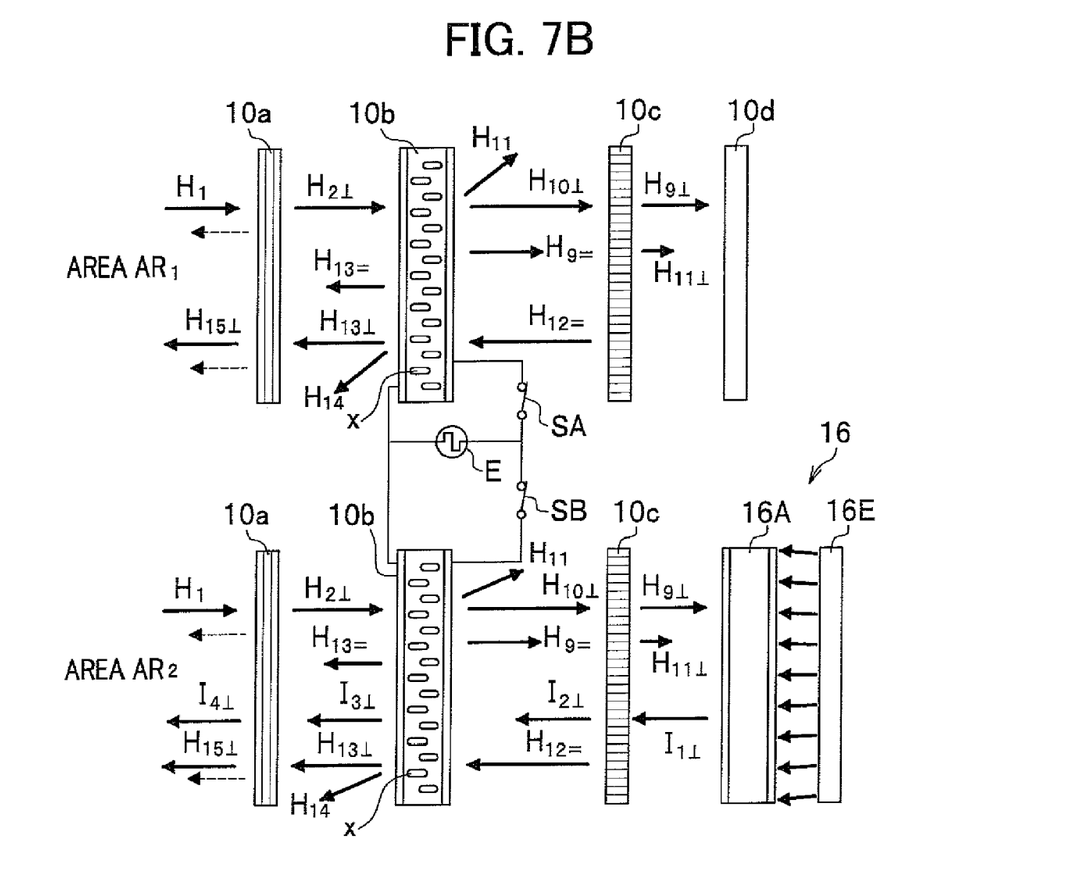
FIG. 7B is a schematic view of a light passing through the mirror body 10 when the liquid crystal glare-proof mirror 100 is in the display mode and in the glare-proof mode.

Operation of the liquid crystal glare-proof mirror 100 in the display mode and in the glare-proof mode is described below. FIG. 7 is an illustration for explaining the liquid crystal glare-proof mirror according to the embodiment in the display mode and in the glare-proof mode. FIG. 7A is a front view of the liquid crystal glare-proof mirror in the display mode and in the glare-proof mode. FIG. 7B is a schematic view of a light passing through the mirror body 10 when the liquid crystal glare-proof mirror 100 is in the display mode and in the glare-proof mode. The switch SA is on because the liquid crystal glare-proof mirror 100 is in the glare-proof mode. More specifically, the propagation of light H1 in the area AR1 in this case is the same as that in the case where the liquid crystal glare-proof mirror 100 is in the glare-proof mode shown in FIG. 5, and thus the description thereof will be omitted. The switch SB is also on because the liquid crystal glare-proof mirror 100 is in the display mode. More specifically, the propagation of light H1 in the area AR2 in this case is the same as that in the case where the liquid crystal glare-proof mirror 100 is in the glare-proof mode shown in FIG. 5. The propagation of the picture lights (I1⊥, I2⊥, I3⊥, I4⊥) in the area AR2 is the same as that in the case shown in FIG. 6, and thus the description thereof will be omitted. It is to be noted that because the picture light I1⊥ ejected from the liquid crystal cell 16A propagates through the optical system having low transmission loss, the picture light I1⊥ is ejected as a picture light I4⊥ whose light volume is substantially the same as that of the picture light I1⊥. As shown in FIG. 7A, a bright picture is displayed in the area AR2 when the area AR1 is in the glare-proof mode. As described above, in the display mode the picture light I4⊥ is ejected from the area AR2 regardless of whether the area AR1 is in the glare-proof mode or in the non-glare-proof mode.

Figure 8:
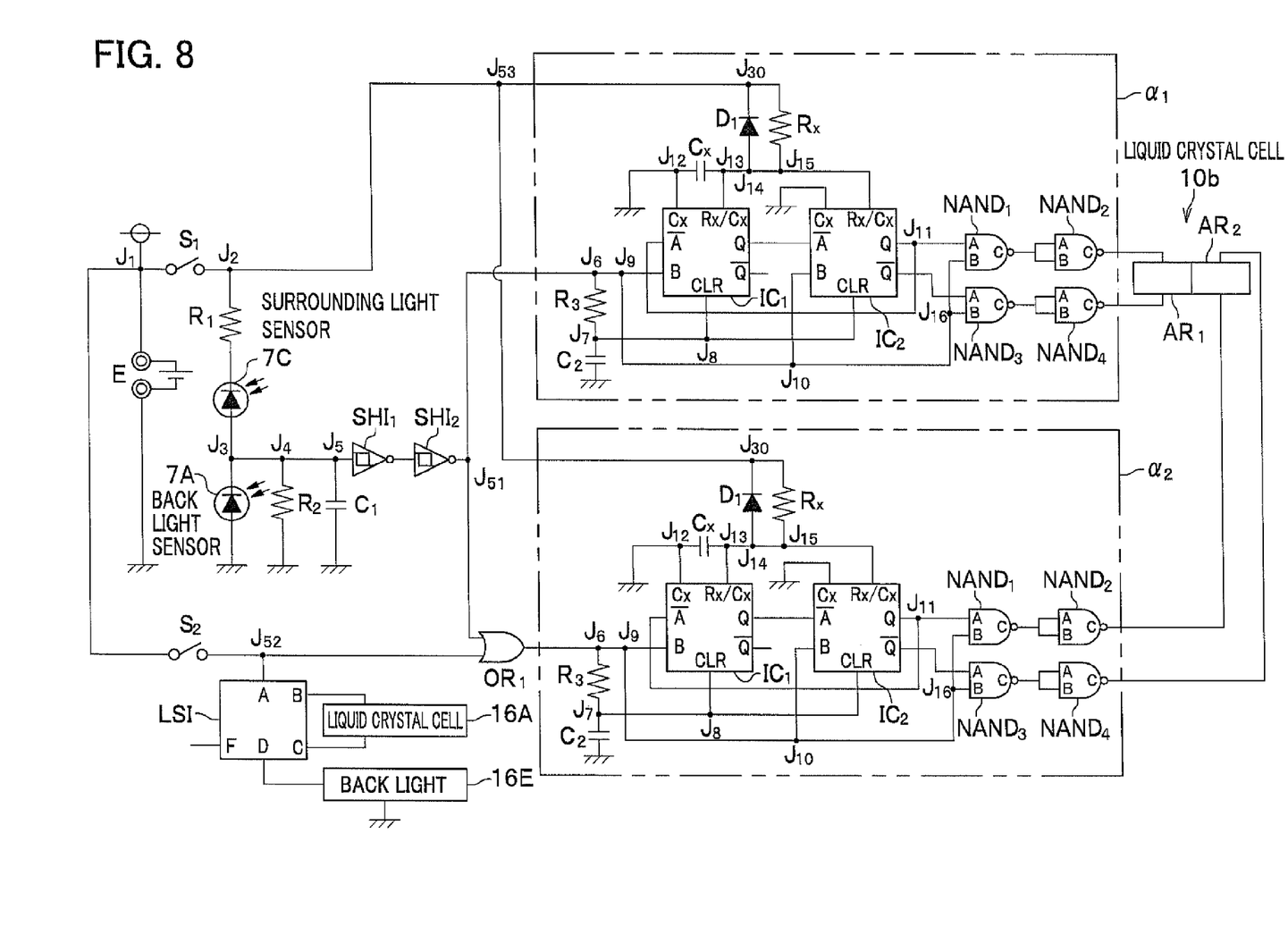
FIG. 8 is a circuit diagram illustrating the example 1 of the liquid crystal cell control circuit.
Figure 9:
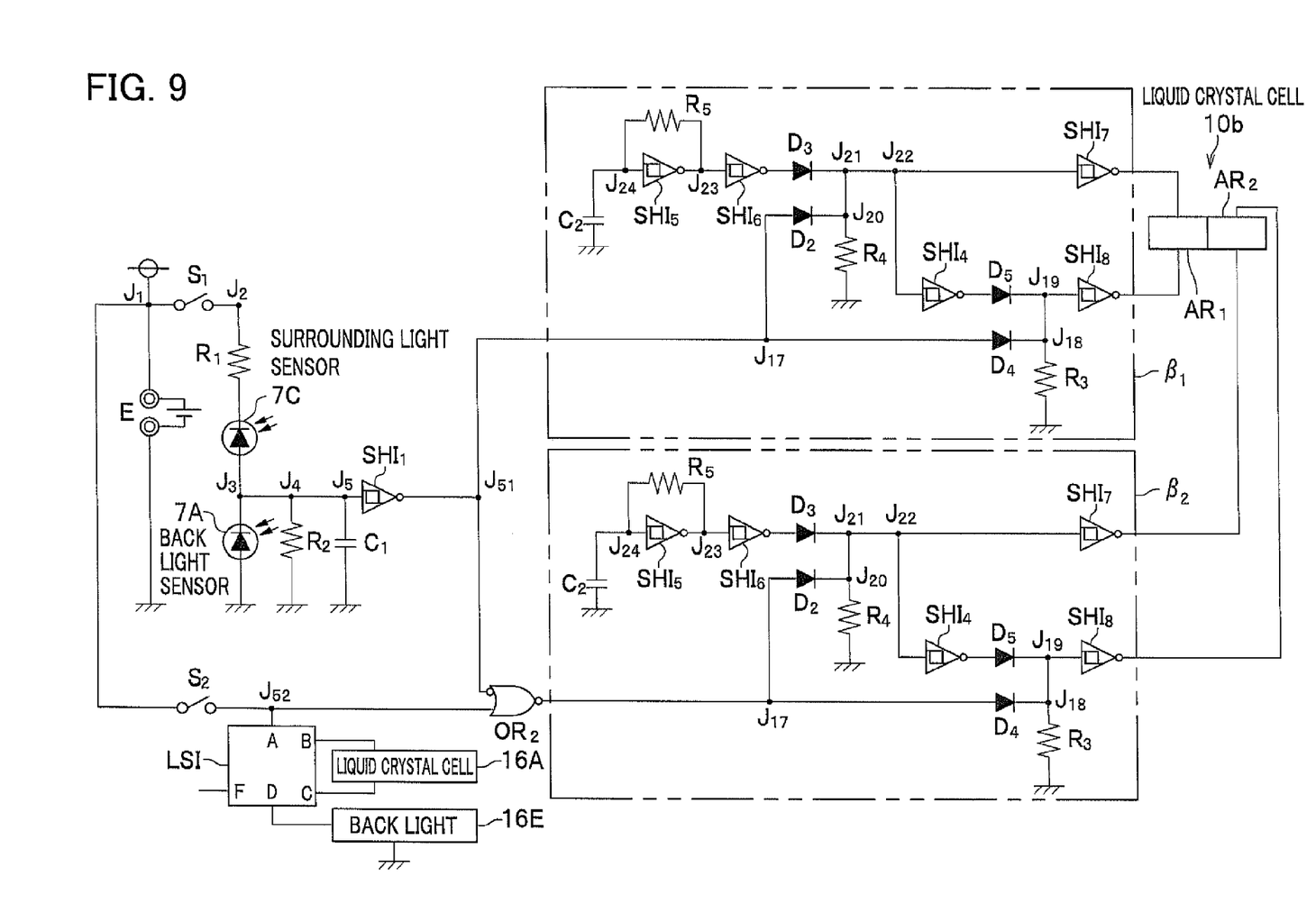
FIG. 9 is a circuit diagram illustrating the example 2 of the liquid crystal cell control circuit.

At last, examples 1 and 2 of a liquid crystal cell control circuit (means) for controlling the liquid crystal cell 10b are explained. FIG. 8 is a circuit diagram illustrating the example 1 of the liquid crystal cell control circuit. FIG. 9 is a circuit diagram illustrating the example 2 of the liquid crystal cell control circuit. The liquid crystal cell control circuit is formed on the plate circuit 7 shown in FIG. 1.

EXAMPLE 1

The positive electrode of a direct current power supply of which an end is grounded is connected to a switch S1 and a switch S2 via a branch point J1 as shown in FIG. 8. Connected to the switch S1 via a branch point J2 are a branch point J53 and a resistance R1. Connected to the switch S2 via a branch point J52 are an input terminal of a circuit OR1 and an input terminal A of a LSI. The LSI controls the liquid crystal cell 16A and the back light 16E. Terminals of a liquid crystal cell 16A are connected to an output terminal B and an output terminal C of the LSI. The back light 16E is connected to an output terminal D of the LSI. When the switch S2 is on, on receiving input from the input terminal A, the LSI applies voltage to the output terminal B and the output terminal C to set the optical transmission rate of each pixel in the liquid crystal cell 16A according to picture data input by an input terminal F, lights the back light 16E and makes the liquid crystal cell 16A to eject picture light.

The surrounding light sensor 7C and the backward light sensor 7A are connected to the resistance R1 in series. The other end of the backward light sensor 7A is grounded. A Schmitt inverter circuit (hereinafter referred to as a "circuit SHI") SHI1 is connected to a branch point J3 between the surrounding light sensor 7C and the backward light sensor 7A. The surrounding light sensor 7C and the backward light sensor 7A are photodiodes whose output voltage increases as received light volume is increased.

A resistance R2 of which an end is grounded is connected via a branch point J4 to the branch point J3 and an input terminal of the circuit SHI1. A condenser C1 of which an end is grounded is connected via a branch point J5 to the branch point J4 and the input terminal of the circuit SHI1. The resistance R2 and the condenser C1 functions as a delay circuit (means) for delaying a signal generated by voltage change at the branch point J3 to be input to the input terminal of the circuit SHI1. An output terminal of the circuit SHI1 is connected to an input terminal of a circuit SHI2.

The circuit SHI1 has hysteresis characteristics, and thus the operation condition of the circuit SHI1 is not changed by voltage change within a range set in advance. The negative logic at the circuit SHI1 is converted to the positive logic at the circuit SHI2, and voltage change is absorbed by the circuit SHI1 and SHI2 having the hysteresis characteristics.

The output terminal of the circuit SHI2 is branched in two ways at the branch point J51, and one end thereof is connected to a branch point J6 in the control circuit α1 for controlling the area AR1, and the other end thereof is connected to the input terminal of the circuit OR1. An output terminal of the circuit OR1 is connected to the branch point J6 in a control circuit α2 for controlling the area AR2. The two control circuits α1 and α2 are composed of the same electrical parts and wirings. The two control circuits α1 and α2 differ in that a logical circuit NAND2 and a logical circuit NAND4 in each control circuit α1 and α2 is connected to a different area. More specifically, the logical circuit NAND2 and the logical circuit NAND4 in the control circuit α1 are connected to the transparent electrodes in the area AR1, and the logical circuit NAND2 and the logical circuit NAND4 in the control circuit α2 are connected to the transparent electrodes in the area AR2. The configuration and function of the control circuit α2, which is the major characteristic of the present invention, for controlling the liquid crystal monitor 16 (refer to FIG. 1) is described below, and the description of the control circuit α1 will be omitted. Each branch point J30 in the control circuits α1 and α2 is connected to the branch point J2 via the branch point J53. Similar reference characters are assigned to corresponding parts and branch points in the control circuits α1 and α2.

The branch point J6 is connected to an input terminal B of a digital IC1. The digital IC1 and a digital IC2 function as an oscillating circuit (means). Each of the digital IC1 and the digital IC2 includes an input terminal A (negative logic) (although a symbol "−" is assigned at the top of the reference symbol A in FIG. 8, the symbol "−" is omitted in the specification), an input terminal B, an output terminal Q (positive logic), an output terminal Q (negative logic) (similarly, the symbol "−" is omitted in the specification), a CLR terminal, a Cx terminal and an Terminal Rx/Cx.

Also connected to the branch point J6 is a resistance R3. A condenser C2 of which an end is grounded is connected to a branch point J7 which is connected to the other end of the resistance R3. The branch point J7 is also connected to a branch point J8, and the branch point J8 is further connected to each CLR terminal of the digital IC1 and the digital IC2. The resistance R3 and the condenser C2 delays a signal being input to the CLR terminal.

The input terminal B of the digital IC2 is connected via a branch point J10 to a branch point J9 between the output terminal of the circuit SHI2 and the input terminal B of the digital IC1. Thus, the same output from the circuit SHI2 is input to each input terminal B in the digital IC1 and the digital IC2.

An output terminal Q (positive logic) of the digital IC1 is connected to the input terminal (negative logic) A of the digital IC2. The output terminal Q (negative logic) of the digital IC1 is opened. An output terminal Q (positive logic) of the digital IC2 is connected via a branch point J11 to the input terminal A (negative logic) of the digital IC1. Thus, when the input terminals B of the digital IC1 and the digital IC2 are high if the output terminal Q (positive logic) of the digital IC2 is low, the output terminal Q (negative logic) of the digital IC2 becomes low, making the output terminal Q (positive logic) of the digital IC1 high and the output terminal Q (negative logic) which is opened low. When the output terminal Q (positive logic) of the digital IC1 becomes low according to the duty ratio set based on the time constant set by the terminals Rx/Cx, the input terminal A (negative logic) of the digital IC2 becomes low. Then, the output terminal Q (positive logic) of the digital IC2 becomes high and the output terminal Q (negative logic) becomes low. By repeating the operation above, when the input terminal B is high, the digital IC1 and the digital IC2 function as an oscillating circuit (means).

An end of the terminal Cx of the digital IC1 is connected to a branch point J12 between an earth and a condenser Cx. The other end of the condenser Cx is connected via a branch point J13 to the terminal Rx/Cx of the digital IC1. The terminal Rx/Cx of the digital IC2 is connected via branch points J14 and J15 to the branch point J13. The terminal Cx of the digital IC2 is grounded. Connected to the branch point J14 is a diode D1 of which negative terminal is disposed at the branch point J14 side. A resistance Rx is also connected to the branch point J15.

A positive electrode of the diode D1 and the other end of the resistance Rx are connected to a branch point J30 and further connected to the positive electrode of the power supply E via the branch point J2. Therefore, when the switch S is switched on, the condenser Cx is charged via the resistance Rx. When the switch S is switched off, the condenser Cx starts to discharge electricity to raise the electrical potential of the terminal Cx of the digital IC1. Thus, the condenser Cx functions as a delay circuit (means), preventing the digital IC1 from being turned off abruptly. When the switch S2 is switched on, the digital IC1 and the digital IC2 are supplied with electricity from the terminals Rx/Cx.

An input terminal A of a logical circuit NAND1 is connected to a branch point J11. An output terminal C of the logical circuit NAND1 is connected to input terminals A and B of the logical circuit NAND2. An output terminal C of the logical circuit NAND2 is connected to a terminal of the area AR2 on one side of the area AR2. An input terminal B of the logical circuit NAND1 and an input terminal B of the logical circuit NAND3 are connected to a branch point J16.

An input terminal A of the logical circuit NAND3 is connected to the output terminal Q (negative logic) of the digital IC2. An output terminal C of the logical circuit NAND3 is connected to input terminals A and B of the logical circuit NAND4. An output terminal C of the logical circuit NAND4 is connected to a terminal of the AR2 on the other side of the area AR2.

Thus, both of the output terminals C of the logical circuit NAND2 and the logical circuit NAND4 have to be low in order not to apply voltage to the area AR2 (area AR1) of the liquid crystal cell 10b. On the other hand, when either one of the output terminals C of the logical circuit NAND 2 and the logical circuit NAND 4 is high and the other one of the output terminals C is low, voltage is applied to the area AR2 of the liquid crystal cell 10b.

In the circuit of example 1 described as above, on/off of the liquid crystal cell 10b is controlled based on the voltage value of the branch point J3 between the surrounding light sensor 7C and the backward light sensor 7A. Operations of the circuit in the non-glare-proof mode and the glare-proof mode are respectively described below. When the output voltage of the backward light sensor 7A is large (i.e. voltage at the branch point J3 is large), or the switch S2 is switched on to control the liquid crystal monitor 16 to display a picture, the circuit OR1 outputs high to apply alternating voltage to the area AR2 as described above, and thus the area AR2 is glare-proofed or a picture is displayed on the liquid crystal monitor 16.

The operation of the liquid crystal glare-proof mirror when back light comes into the liquid crystal glare-proof mirror while surrounding light is strong is described below. In this case, a driver is not dazzled because the back light is made less glaring by the surrounding light. Thus, the area AR1 is controlled to be the non-glare-proof mode regardless of whether or not a picture is displayed on the area AR2. In this case, even if the received light volume of the backward light sensor 7A is large, because the received light volume of the surrounding light sensor 7C is also large and the output voltage of the surrounding light sensor 7C is large, the voltage value of the branch point J3 does not become large, and thus the input terminal of the circuit SHI1 becomes low. At this time, the output of the circuit SHI1 is high and the output of the circuit SHI2 is low. Thus, in the control circuit α1, each input terminal B and each CLR terminal in the digital IC1 and digital IC2 are low. Each input terminal B in the logical circuit NAND1 and the logical circuit NAND3 is low and thus each output terminal C in the logical circuit NAND1 and the logical circuit NAND3 is high. Therefore, each output terminal C in the logical circuit NAND2 and the logical circuit NAND4 becomes low. Thus, voltage is not applied to the area AR1, and the area AR1 in the liquid crystal glare-proof mirror 100 is not glare-proofed.

When the liquid crystal glare-proof mirror 100 is in the non-displaying mode and in the non-glare-proof mode, the branch point J51 is low and the switch S2 is off, the output of the circuit OR1 is low and the control circuit α2 is not operated, and thus the area AR2 exhibits a polarization rotation characteristic and is in the non-glare-proof mode, which is the same as the area AR1. When the liquid crystal glare-proof mirror is in the displaying mode, because the branch point J51 is low, the switch S2 is on, the control circuit α1 is not operated and the control circuit α2 is operated, voltage is not applied to the area AR1 but alternating voltage is applied to the area AR2, which makes the liquid crystal glare-proof mirror in the displaying mode and in the non-glare-proof mode.

When back light comes into the liquid crystal glare-proof mirror while surrounding light is weak, the liquid crystal glare-proof mirror is controlled to be in the glare-proof mode because the back light is emphasized too much and a driver is dazzled. To be more specific, the voltage value of the branch point J3 becomes large in this case because the received light volume of the surrounding light sensor 7C is small, the output voltage thereof is also small, the received light volume of the backward light sensor 7A is large and the output voltage thereof is also large. Therefore, the input terminal of the circuit SHI1 becomes high, making the output voltage of the circuit SHI2 high. Then each input terminal B in the logical circuit NAND1and the logical circuit NAND3 becomes high in the control circuit α1. Each input terminal of the digital IC1 and the digital IC2 is also high, and thus the digital IC1 and the digital IC2 starts to function as an oscillating circuit. Thus, the logical circuit NAND1and the logical circuit NAND3 repeats an on-off operation according to the output of the digital IC2, causing the logical circuit NAND2 and the logical circuit NAND4 to perform an on-off operation corresponding to the on-off operation of the logical circuit NAND1and the logical circuit NAND3. Thus, alternating voltage is applied to the liquid crystal cell 10b, and the area AR1 of the liquid crystal glare-proof mirror 100 is in the glare-proof mode.

When the liquid crystal glare-proof mirror is in the glare-proof mode, alternating voltage is applied to the area AR2 regardless of whether the liquid crystal glare-proof mirror is in the display-mode or the non-display mode. When the area AR2 is in the glare-proof mode, the control circuit α2 is always operated because high is input to the circuit OR1 regardless of whether the switch S2 is switched on or switched off. When the liquid crystal glare-proof mirror is in the display mode, the switch S2 is switched on, causing the LSI to start operation, and picture light is ejected from the liquid crystal cell 16A, but the operation condition of the control circuit α2 is not affected.

EXAMPLE 2

Similarly to the example 1, in the example 2 the positive electrode of the direct current power supply E of which an end is grounded is connected to the switch S1 and the switch S2 via the branch point J1 as shown in FIG. 9. Connected to the positive electrode of the power supply E is the resistance R1. Connected via the branch point J52 to the switch S2 is the input terminal of the circuit OR1 and the input terminal A of the LSI. The LSI controls the operation of the liquid crystal cell 16A and the back light 16E. Terminals of the liquid crystal cell 16A are connected to the output terminal B and the output terminal C of the LSI. The back light 16E is connected to the output terminal D of the LSI. When the switch S2 is on, on receiving input of the input terminal A, the LSI applies alternating voltage to the output terminal B and the output terminal C to set the optical transmission rate of each pixel in the liquid crystal cell 16A according to picture data input by the input terminal F, and lights the back light 16E to eject picture light from the liquid crystal cell 16A. Similar reference symbols are assigned to corresponding parts in the example 1 and the example 2.

The surrounding light sensor 7C and the backward light sensor 7A are connected to the resistance R1 in series. The other end of the backward light sensor 7A is grounded. The schmitt inverter circuit (referred to as the "circuit SHI" hereinafter) SHI1 is connected to the branch point J3 between the surrounding light sensor 7C and the backward light sensor 7A. The circuit SHI1 has hysteresis characteristics so that the operation condition of the circuit SHI1 is not changed by a voltage change within a range set in advance.

The negative logic output terminal of the circuit SHI1 is connected to the branch point J51. Connected to the branch point J51 is the branch point J17 in a control circuit β1 controlling the area AR1. Also connected to the branch point J51 is a negative logic input terminal of a circuit OR2. A positive logic input terminal of the circuit OR2 is connected to the branch point J52, which is further connected to the switch S2. An output terminal of the circuit OR2 is set to be negative logic. To be more specific, the circuit OR2 is set such that when the negative logic input terminal of the circuit OR2 is low, or the positive logic input terminal thereof is high, the output terminal thereof outputs low. The output terminal of the circuit OR2 is connected to a branch point J17 in a control circuit β2 controlling the area AR2.

Similarly to the description on the example 1, configuration and functions of the control circuit β2 controlling the liquid crystal monitor 16 (refer to FIG. 1), which are the main characteristics of the embodiment, are described in the example 2, and the description of the control circuit β1 will be omitted. The anode of a diode D4 and the anode of a diode D2 are connected to the branch point J17. The resistance R3 of which an end is grounded is connected via a branch point J18 to the cathode of the diode D4. Connected to the branch point J18 via a branch point J19 is an input terminal of a circuit SHI 8. An output terminal of the circuit SHI 8 is connected to a terminal of the area AR2 of the liquid crystal cell 10b on one side of the area AR2.

A resistance R4 of which an end is grounded is connected to the cathode of the diode D2 via a branch point J20. Connected to the branch point J20 via a branch point J21 is an input terminal of a circuit SHI7. An output terminal of the circuit SHI7 is connected to a terminal of the area AR2 of the liquid crystal cell 10b on the other side of the area AR2. Therefore, when voltage is not applied to the liquid crystal cell 10b, both output terminals of the circuit SHI7 and the circuit SHI8 are low, whereas when voltage is applied to the liquid crystal cell 10b, each output terminal of the circuit SHI7 and the circuit SHI8 outputs high and low alternately.

An input terminal of the circuit SHI4 is connected to a branch point J22 between the branch point J21 and the circuit SHI7, and an output terminal of the circuit SHI4 is connected to the branch point J19 via a diode D5. Connected to the branch point J21 is the cathode of a diode D3, and the anode of the diode D3 is connected to an output terminal of the circuit SHI6. Connected to an input terminal of the circuit SHI6 via a branch point J23 are an output terminal of the circuit SHI5 and a resistance R5. The resistance R5 is also connected to an input terminal of the circuit SHI5 via a branch point J24, and the input terminal of the circuit SHI5 is connected via the branch point J24 to a condenser C2 of which an end is grounded.

In the circuit described above, when the liquid crystal glare proof mirror is in the non-glare-proof mode (i.e. when the branch point J3 is low), the output terminal of the circuit SHI1 becomes high, making the diode D2 conduct and its potential on the branch point J21 side high. Thus, reverse voltage is applied to the diode D3, making the potential of the output terminal of the circuit SHI6 low, and thus the potential of the branch point J23 becomes high. The condenser C2, the circuit SHI5 and the resistance R5 constitutes an astable multivibrator (oscillating circuit (means)). Thus, when the branch point J23 is high, the condenser C2 is charged through the resistance R5. It is to be noted that the condenser C2 remains saturated with the branch point J23 kept being high because a trigger voltage of the circuit SHI5 is not exceeded when reverse voltage is applied to the diode D3.

At this time, the input terminal of the circuit SHI8 is high and the output terminal of the circuit SHI8 is low because the diode D4 is conducted in a forward direction. The input terminal of the circuit SHI7 is high and the output terminal of the circuit SHI7 is low because the diode D2 is conducted. Thus, voltage is not applied to the liquid crystal cell 10b, and the liquid crystal glare-proof mirror 100 is in the non-glare-proof mode. Forward voltage is applied to the diode D5 because the input terminal of the circuit SHI4 is high, the output terminal of the circuit SHI4 is low and the branch point J19 is high.

When the liquid crystal glare-proof mirror is in the non-display-mode and in the non-glare-proof mode, because the branch point J51 is high, the switch S2 is off, the output of the circuit OR2 is high, and the control circuit β2 is not operated, and thus the area AR2 exhibits polarization rotatory power and is in the non-glare-proof mode as described above, which is the same as the area AR1. On the other hand, when the liquid crystal glare-proof mirror is in the display-mode, the branch point J51 is low and the switch S2 is switched on, and thus the control circuit β2 is operated, applying alternating voltage to the area AR2 to display a picture.

When the non-glare-proof mode is switched to the glare-proof mode in the non-display mode (i.e. the branch point J3 becomes high), the output terminal (branch point J51) of the circuit SHI1 becomes low, and thus reverse voltage is applied to the diode D2 in the control circuit β1, causing the potential of the diode D2 on the branch point J21 side to be low through the resistance R4. On the other hand, the low voltage applied to the output terminal of the circuit SHI6 is reduced by the reverse voltage applied to the diode D3, and the condenser C2 begins to discharge based on a balance between a trigger voltage of the circuit SHI6 and a trigger voltage of the circuit SHI5, causing the condenser C2 and the circuit SHI5 and the resistance R5 to start oscillation. The oscillation is transmitted to the branch point J22 via the diode D3, and thus the output terminal of the circuit SHI7 repeats inversion of high and low, and the circuit SHI4 and the circuit SHI8 synchronizes with the circuit SHI7 to repeat inversion of high and low which is reversed from the inversion at the circuit SHI7. Thus, voltage is applied to the area AR1 in the liquid crystal cell 10b, making the area AR1 of the liquid crystal glare-proof mirror 100 be in the glare-proof mode.

When the liquid crystal glare-proof mirror is in the non-display-mode and in the glare-proof mode, the branch point J51 is low, the switch S2 is switched off, and the output of the circuit OR2 is low. Thus, similarly to the area AR1, voltage is also applied to the area AR2, which makes the area AR2 be in the glare-proof mode. On the other hand, when the liquid crystal glare-proof mirror is in the display-mode and in the glare-proof mode, similarly to the non-display mode and in the glare-proof mode, voltage is applied to the areas AR1 and AR2 because the branch point J51 is low. The LSI is operated because the switch S2 is switched on. Thus, in the liquid crystal glare-proof mirror 100, a picture light formed by the liquid crystal cell 16A and the back light 16E is ejected from the area AR2.

In accordance with the liquid crystal glare-proof mirror 100 according to the embodiment, it is possible to display a bright screen by propagating picture light through an optical system of which optical transmission loss is low. Because the liquid crystal glare-proof mirror 100 is composed of optical components such as the polarizing plate 10a, the liquid crystal cell 10b and the reflection polarizing plate 10c and the like, even if a part of picture light is reflected by an incidence plane, the light volume of the transmitted light is not decreased as much as when a half mirror is used, which reflects and transmits light in substantially the same ratio.

Modification 1

In the above embodiments, the liquid crystal glare-proof mirror 100 includes both of the surrounding light sensor 7C and the backward light sensor 7A, however, the liquid crystal glare-proof mirror 100 may include at least one of them.

Modification 2

In the above embodiments, the liquid crystal glare-proof mirror 100 includes the TN liquid crystal as a light transmission shutter, however the liquid crystal glare-proof mirror 100 may include any other components as a light transmission shutter as long as the components have a shutter function without limited to the TN liquid crystal.

Modification 3

In the above embodiments, the liquid crystal is used as a light transmission shutter, however, Faraday rotator using a so-called Faraday effect that exhibits a polarization rotatory power when given a magnetic field may be used as a shutter element.

It is preferable that the non-glare-proof mode and the glare-proof mode is switched gradually (step by step), and the display mode and the non-display mode is switched quickly.

The embodiments according to the present invention have been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A liquid crystal glare-proof mirror that switches a non-glare-proof mode and a glare-proof mode and displays a picture thereon, comprising:
    a first polarizing plate for selecting a polarization component to be transmitted through the first polarizing plate;
    a liquid crystal cell disposed on a back side of the first polarizing plate and having two control areas thereon, each of which is controlled independently;
    a second polarizing plate disposed on a back side of the liquid crystal cell, the second polarizing plate transmitting either of two orthogonal polarization components of light and reflecting the other of the polarization components; and
    an image generating apparatus disposed on a back of the second polarizing plate at a part corresponding to either of the two control areas, the image generating apparatus emitting the picture light having a polarization component which is transmitted through the second polarizing plate.

2. The liquid crystal glare-proof mirror according to claim 1, wherein
    when the picture light is not emitted from the image generating apparatus
    the liquid crystal glare-proof mirror controls switching between the non-glare-proof mode and the glare-proof mode by synchronizing both the two control areas.

3. The liquid crystal glare-proof mirror according to claim 1, wherein the image generating apparatus comprises an optical absorption function for absorbing light transmitted through the second polarizing plate.

4. The liquid crystal glare-proof mirror according to claim 2, wherein the image generating apparatus comprises an optical absorption function for absorbing light transmitted through the second polarizing plate.

5. The liquid crystal glare-proof mirror according to claim 1, wherein an optical absorption member for absorbing light is disposed on the back side of the second polarizing plate at a part corresponding to the other of the two control areas where the image generating apparatus is not disposed.

6. The liquid crystal glare-proof mirror according to claim 2, wherein an optical absorption member for absorbing light is disposed on the back of the second polarizing plate at a part corresponding to the other of the two control areas where the image generating apparatus is not disposed.

7. The liquid crystal glare-proof mirror according to claim 3, wherein an optical absorption member for absorbing light is disposed on the back side of the second polarizing plate at a part corresponding to the other of the two control areas where the image generating apparatus is not disposed.

8. The liquid crystal glare-proof mirror according to claim 4, wherein an optical absorption member for absorbing light is disposed on the back side of the second polarizing plate at a part corresponding to the other of the two control areas where the image generating apparatus is not disposed.

* * * * *